United States Patent [19]
Mizuno et al.

[11] Patent Number: 5,636,204
[45] Date of Patent: Jun. 3, 1997

[54] TRANSMISSION FAULT PROCESSING METHOD AND TRANSMISSSION FAULT PROCESSING DEVICE

[75] Inventors: Hiroyuki Mizuno; Takashi Tai; Noriyuki Kimura, all of Kanazawa; Hiroaki Nagao, Kawasaki, all of Japan

[73] Assignee: Fujitsu Limited, Kanagawa, Japan

[21] Appl. No.: 506,865

[22] Filed: Jul. 25, 1995

[30] Foreign Application Priority Data

Jan. 20, 1995 [JP] Japan ................................ 7-007441
Jun. 15, 1995 [JP] Japan ................................ 7-148637

[51] Int. Cl.$^6$ .............................. H04L 12/26; H04J 3/14
[52] U.S. Cl. .............................. 370/245; 370/252
[58] Field of Search .......................... 370/13, 16, 16.1, 370/17, 110.1, 76, 14; 340/825.06, 825.16; 379/32, 33

[56] References Cited

U.S. PATENT DOCUMENTS

| | | | |
|---|---|---|---|
| 5,070,497 | 12/1991 | Kleine-Altekamp | 370/13 |
| 5,212,475 | 5/1993 | Thoma | 370/13 |
| 5,343,462 | 8/1994 | Sekihata et al. | 370/13 |
| 5,440,540 | 8/1995 | Kremer | 370/16.1 |
| 5,461,607 | 10/1995 | Miyagi et al. | 370/16 |
| 5,471,477 | 11/1995 | Dries et al. | 370/13 |

FOREIGN PATENT DOCUMENTS

| | | |
|---|---|---|
| 1-106654 | 4/1989 | Japan . |
| 3-57344 | 3/1991 | Japan . |
| 6-69923 | 3/1994 | Japan . |

*Primary Examiner*—Wellington Chin
*Assistant Examiner*—Soon Dong Hyun
*Attorney, Agent, or Firm*—Helfgott & Karas, P.C.

[57] ABSTRACT

Designed such that in systems comprising a plurality of transmission devices and transmission lines connecting the transmission devices, transmission line fault data indicating fault event conditions on transmission lines is circulated among the transmission devices and when a fault is verified on a connecting transmission line, verified transmission line fault data is appended by the transmission devices to the input transmission line fault data for output.

8 Claims, 16 Drawing Sheets

FIG. 9

| 7 | 6 | 5 | 4 | 3 | 2 | 1 | 0 |
|---|---|---|---|---|---|---|---|
| in0.64 | in0.63 | in0.62 | in0.61 | in0.60 | in0.59 | in0.58 | in0.57 |
| in1.64 | in1.63 | in1.62 | in1.61 | in1.60 | in1.59 | in1.58 | in1.57 |
| in0.56 | in0.55 | in0.54 | in0.53 | in0.52 | in0.51 | in0.50 | in0.49 |
| in1.56 | in1.55 | in1.54 | in1.53 | in1.52 | in1.51 | in1.50 | in1.49 |
| in0.48 | in0.47 | in0.46 | in0.45 | in0.44 | in0.43 | in0.42 | in0.41 |
| in1.48 | in1.47 | in1.46 | in1.45 | in1.44 | in1.43 | in1.42 | in1.41 |
| ≈ | ≈ | ≈ | ≈ | ≈ | ≈ | ≈ | ≈ |
| in0.16 | in0.15 | in0.14 | in0.13 | in0.12 | in0.11 | in0.10 | in0.09 |
| in1.16 | in1.15 | in1.14 | in1.13 | in1.12 | in1.11 | in1.10 | in1.09 |
| in0.08 | in0.07 | in0.06 | in0.05 | in0.04 | in0.03 | in0.02 | in0.01 |
| in1.08 | in1.07 | in1.06 | in1.05 | in1.04 | in1.03 | in1.02 | in1.01 |

FIG. 10

| SUPPRESSION PATTERN NUMBER | HIGHER LEVEL ALARM CONTENT | SUPPRESSED LOWER ALARMS | SUPPRESSION CONDITION |
|---|---|---|---|
| 1 | TRANSMISSION LINE FAULT DETECTED AT BIT/SIGNAL CONVERSION UNIT | · INTER-NODAL TRANSMISSION ABNORMALITY | · UNCONDITIONAL |
|  | BIT/SIGNAL CONVERSION UNIT NOT MOUNTED<br>NON-SYNCHRONICITY DETECTED AT BIT/SIGNAL CONVERSION UNIT | · TERMINAL I/F UNIT DIR<br>· TERMINAL I/F UNIT BAIS<br>· TERMINAL I/F UNIT PTY | · SUPPRESSION OF INTER-NODALLY CONNECTED TERMINAL I/F ONLY |
| 2 | TRANSMISSION LINE FAULT EVENT<br>(OTHER NODE DETECTS TRANSMISSION LINE FAULT EVENT) | · INTER-NODAL TRANSMISSION ABNORMALITY | · UNCONDITIONAL |
|  |  | · TERMINAL I/F UNIT PTY | · SUPPRESSION OF TERMINAL I/F RELATED TO FAULT EVENT TRANSMISSION LINE ONLY |
| ... |  |  |  |

FIG. 11

| R(0) | R(0) | CMD/ST | R(0) | R(0) | R(0) | R(0) | OSC1DN | |
|------|------|--------|------|------|------|------|--------|---|
| DPLL U | R(0) | R(0) | ST1A | R(0) | LBA | R(0) | TXA | |
| R(0) | R(0) | R(0) | ROMPTY | FFRXOF | FFRXUP | FFTXOF | FFTXUP | |
| R(0) | R(0) | R(0) | PPERR | R(0) | R(0) | R(0) | R(0) | |
| BA1S1 | R(0) | R(0) | PTY1DE | DIR1IL | PP1DN | CK1DN | SEL1AL | 1 SYSTEM FAULT |
| BA1S0 | R(0) | R(0) | PTY0DE | DIR0IL | PP0DN | CK0DN | SEL0AL | 0 SYSTEM FAULT |
| R(0) | R(0) | R(0) | R(0) | R(0) | R(0) | R(0) | R(0) | |
| R(0) | R(0) | R(0) | R(0) | R(0) | R(0) | R(0) | R(0) | |
| di1.16 | di1.15 | di1.14 | di1.13 | di1.12 | di1.11 | di1.10 | di1.09 | 1 SYSTEM FAULT |
| di0.16 | di0.15 | di0.14 | di0.13 | di0.12 | di0.11 | di0.10 | di0.09 | 0 SYSTEM FAULT |
| di1.08 | di1.07 | di1.06 | di1.05 | di1.04 | di1.03 | di1.02 | di1.01 | 1 SYSTEM FAULT |
| di0.08 | di0.07 | di0.06 | di0.05 | di0.04 | di0.03 | di0.02 | di0.01 | 0 SYSTEM FAULT |
| R(0) | R(0) | R(0) | R(0) | R(0) | R(0) | R(0) | R(0) | |
| R(0) | R(0) | R(0) | R(0) | R(0) | R(0) | R(0) | R(0) | |
| PT1.16 | PT1.15 | PT1.14 | PT1.13 | PT1.12 | PT1.11 | PT1.10 | PT1.09 | 1 SYSTEM FAULT |
| PT0.16 | PT0.15 | PT0.14 | PT0.13 | PT0.12 | PT0.11 | PT0.10 | PT0.09 | 0 SYSTEM FAULT |
| PT1.08 | PT1.07 | PT1.06 | PT1.05 | PT1.04 | PT1.03 | PT1.02 | PT1.01 | 1 SYSTEM FAULT |
| PT0.08 | PT0.07 | PT0.06 | PT0.05 | PT0.04 | PT0.03 | PT0.02 | PT0.01 | 0 SYSTEM FAULT |
| NCID | OUTC | R(0) | R(0) | R(0) | R(0) | R(0) | R(0) | |
| R(0) | R(0) | R(0) | R(0) | R(0) | R(0) | R(0) | R(0) | |

▓ : PATTERN 1 MASK
▒ : PATTERN 1 OR 2 MASK

FIG. 12

| | | |
|---|---|---|
| PATTERN 1 | 0 SYSTEM FAULT (20) | →{ff,ff,ff,ff,ff,67,ff,ff, ff,00,ff,00,ff,ff,ff,00,ff,00,ff,ff} |
| | 1 SYSTEM FAULT (20) | →{ff,ff,ff,ff,67,ff,ff,ff, 00,ff,00,ff,ff,ff,00,ff,00,ff,ff,ff} |
| PATTERN 2 | 0 SYSTEM FAULT (20) | →{ff,ff,ff,ff,ff,ef,ff,ff, ff,ff,ff,ff,ff,ff,ff,00,ff,00,ff,ff} |
| | 1 SYSTEM FAULT (20) | →{ff,ff,ff,ff,ef,ff,ff,ff, ff,ff,ff,ff,ff,ff,00,ff,00,ff,ff,ff} |
| ≈ | ≈ | ≈ |
| PATTERN n | 0 SYSTEM FAULT (20) | |
| | 1 SYSTEM FAULT (20) | |

FIG. 13

| PATH NUMBER | CONNECTION CONFIGURATION | CONNECTION TIME SLOT |
|---|---|---|
| 1 | INTER-NODAL | A→a CONNECTION TIME SLOT |
| 2 | INTER-NODAL | a→A CONNECTION TIME SLOT |
| 3 | INTER-NODAL | B→b CONNECTION TIME SLOT |
| 4 | INTER-NODAL | b→B CONNECTION TIME SLOT |
| 5 | INTER-NODAL | C→c CONNECTION TIME SLOT |
| 6 | INTER-NODAL | c→C CONNECTION TIME SLOT |
| 7 | NONE | NONE |
| ⋮ | ⋮ | ⋮ |
| PATH X | NONE | NONE |

FIG. 14

| TRANSMISSION LINE | PATH NUMBER |
|---|---|
| 1 | 2、4、6 |
| 2 | 1、3、5、 |
| 3 | 2、3、6 |
| 4 | 2、4、5 |
| 5 | NONE |
| ⋮ | ⋮ |
| z | NONE |

TRANSMISSION FAULT PROCESSING METHOD AND TRANSMISSSION FAULT PROCESSING DEVICE

BACKGROUND OF THE INVENTION

1. Field of the Invention

The present invention relates to a method and a device for distinguishing between and performing fault processing on transmission line faults and secondary faults generated by the effect of transmission line fault events in transmission systems comprising a plurality of transmission devices (nodes) and transmission lines connecting them.

2. Description of the Related Art

When a fault occurs in a transmission system comprising a plurality of transmission devices (nodes) and transmission lines connecting them, a higher level alarm is generated in response to the fault; depending on the fault, secondary alarms may be generated due to the effects of the upper level alarm.

For this reason, priority is established among alarms, and when a higher level alarm is generated, an alarm suppression process for suppressing generation of lower level alarms is carried out.

However, faults generated on transmission lines can only be detected by nodes connected to the transmission line on which the fault has occurred, and other nodes cannot recognize the transmission line fault that is the primary cause, detecting only lower level alarms. For example, in the ring connection system depicted in FIG. 2, when a fault is generated on the transmission line between node #1 and node #2, node #1 and node #4 detect an inter-nodal transmission fault. Node #2 detects an input signal interrupt fault, an inter-nodal transmission fault, and abnormal connection path parity between terminal A and terminal a. Node #3 detects inter-nodal transmission fault, an abnormal connection path parity between terminal B and terminal b, and an abnormal connection path parity between terminal C and terminal c.

As a result, the network supervisory device is notified by a plurality of alarms, all originating in the same fault, from the transmission devices. This leads to increased traffic and to difficulty in identifying the primary cause.

Lower level alarms take various forms, such as those generated unconditionally and those generated only in relation to transmissions through a transmission line on which a fault has occurred.

Thus, in addition to suppression of alarm generation in the nodes themselves, means are required to suppress inter-nodal alarms generated when an alarm is generated on a transmission line.

In order to suppress such inter-nodal alarms, the following two technologies, for example, are used conventionally.

The first conventional technology involves detection of alarm data by a supervisory program loaded on each node; when higher level alarm transmission line fault data is detected, this data is transmitted to other nodes, and the nodes receiving this transmission ignore lower level alarm events and do not notify the network supervisory device.

The second conventional technology involves input of all alarm data by the network supervisory device, after which the alarm data is retrieved one item at a time, and if a higher level alarm occurs, the lower level alarms are ignored and are not retrieved.

With the first conventional technology, there is a drawback in that lower alarms notification is made until the higher level alarm failure data has been transmitted to all nodes and a drawback in that rapid processing is not possible due to the fact that transmission line fault data is transmitted by the agency of the supervisory program loaded on each node.

With the second conventional technology, there is a drawback in that the network supervisory device is notified of all occurring alarms so traffic on transmission lines increases to produce a jam, and a drawback in that the burden on the network supervisory device increases.

SUMMARY OF THE INVENTION

With the foregoing in view, a first object of the present invention is to provide a transmission failure processing method capable of suppressing notification of secondary faults that spread over the entire system during transmission fault events.

A second object of the present invention is to provide a transmission failure processing device capable of suppressing notification of secondary faults over the entire system during transmission fault events.

(First Transmission Fault Processing Method of the Present Invention)

In the first transmission fault processing method of the present invention, in order to solve the first problem in systems comprising a plurality of transmission devices and transmission lines connecting these transmission devices, transmission fault data indicating fault event conditions on transmission lines is circulated among the transmission devices. The transmission devices are designed so that when a fault is verified on connecting transmission lines 20A–20D, verified transmission line fault data is appended to the input transmission line fault data, which is then output (corresponds to claim 1).

By means of the first transmission fault processing method of the present invention, each transmission device 10A–10D can independently, simultaneously, and instantaneously verify data for a transmission line fault occurring at an arbitrary location. In addition, the transmission devices 10A–10D refer to transmission fault data and withhold from notification of lower level alarm fault data, so it is possible to suppress notification of secondary faults throughout the entire system when a transmission line fault has occurred and to prevent an increase in traffic on transmission lines.

BRIEF DESCRIPTION OF THE DRAWINGS

FIG. 9 is a diagram depicting an example of transmission line fault data of a transmission system with duplex channels;

FIG. 10 is a diagram depicting a suppression pattern table of the embodiment;

FIG. 11 is a diagram depicting a terminal I/F section alarm register of the embodiment;

FIG. 12 is a diagram depicting an alarm suppression table and the structure thereof of the embodiment;

FIG. 13 is a diagram depicting a path data table of the embodiment;

FIG. 14 is a diagram depicting a connection configuration management table of the embodiment;

DESCRIPTION OF THE PREFERRED EMBODIMENTS

Before describing a specific embodiment of the present invention, an outline of the structure of the present invention will be presented, referring to means used to solve the problems addressed by the invention.

(First Transmission Fault Processing Method of the Present Invention)

Figure 1:
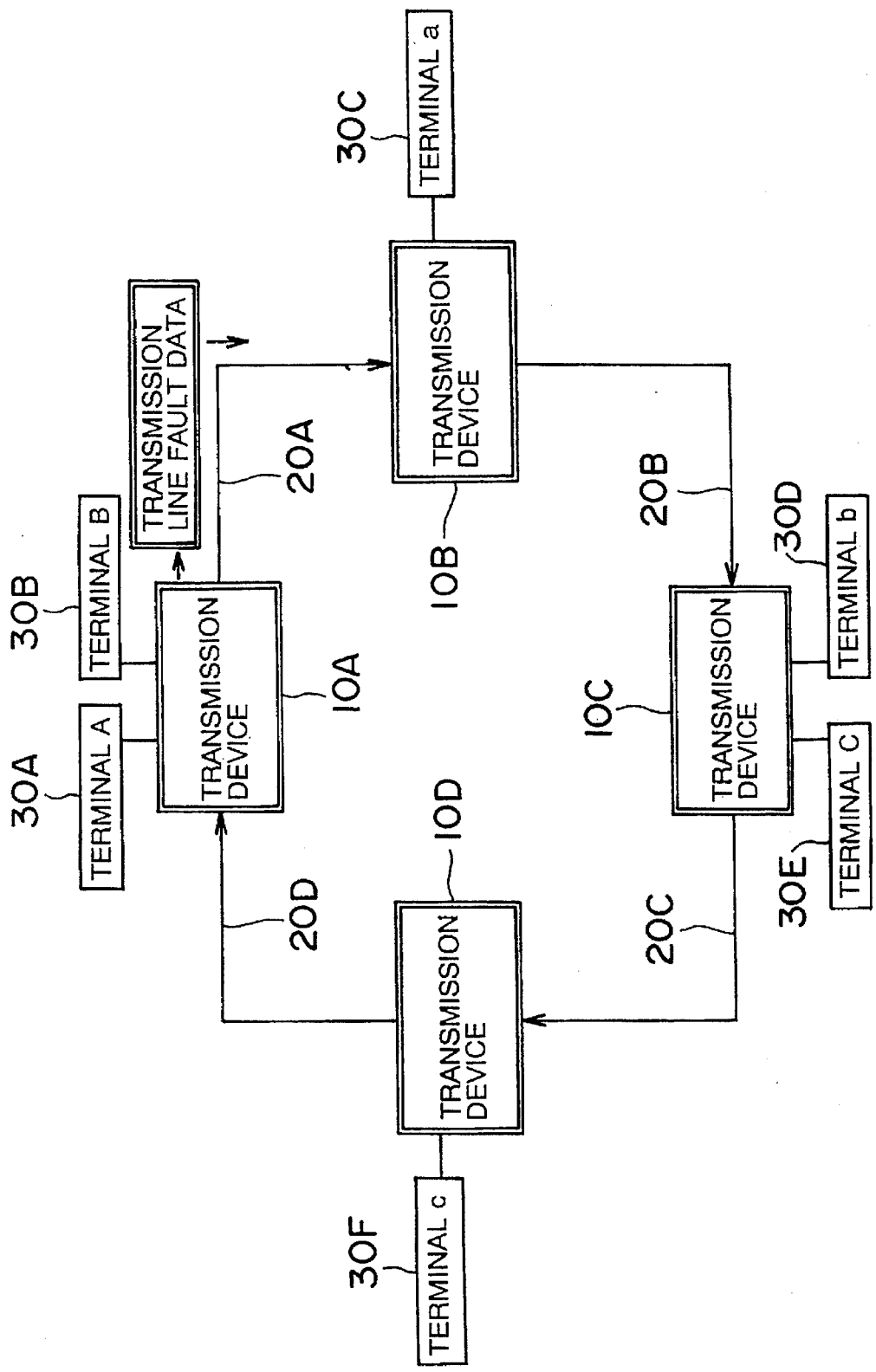
FIG. 1 is a basic flow chart depicting the transmission fault processing method of the present invention.

In order to solve the first problem noted above, the first transmission fault processing method of the present invention is designed in the following way. FIG. 1 is a basic flow chart reflecting the transmission fault processing method in the present invention.

Specifically, in a system comprising a plurality of transmission devices 10A–10D and transmission lines 20A–20D connecting these transmission devices 10A–10D, transmission line fault data indicating fault event conditions on transmission lines 20A–20D is circulated among the transmission devices 10A–10D. The transmission devices 10A–10D are designed so that when a fault is verified on connecting transmission lines 20A–20D, verified transmission line 20A–20D fault data is appended to the input transmission line fault data, which is then output (corresponds to claim 1).

By means of the first transmission fault processing method of the present invention, each transmission device 10A–10D can independently, simultaneously, and instantaneously verify data for a transmission line fault occurring at an arbitrary location. In addition, the transmission devices 10A–10D refer to transmission fault data and withhold from notification of lower level alarm fault data, so it is possible to suppress notification of secondary faults throughout the entire system when a transmission line fault has occurred and to prevent an increase in traffic on transmission lines.

(Second Transmission Fault Processing Method of the Present Invention)

In order to solve the first problem noted above, the second transmission fault processing method of the present invention is designed in the following way.

Specifically, in the first transmission fault processing method, the transmission devices 10A–10D, when transmission line fault data cannot be input from the transmission lines 20A–20D, assemble the transmission line fault data and output it to the transmission lines 20A–20D (corresponds to claim 2).

By means of the second transmission fault processing method of the present invention, even when transmission line fault data cannot be input due to disconnection of transmission lines 20A–20D, the remaining transmission system can be expected to function normally. In addition, the transmission devices 10A–10D refer to transmission line fault data and withhold from notification of lower level alarm fault data, so it is possible to suppress notification of secondary faults throughout the entire system when a transmission line fault has occurred and to prevent an increase in traffic on transmission lines.

(Third Transmission Fault Processing Method of the Present Invention)

In order to solve the first problem noted above, the third transmission fault processing method of the present invention is designed in the following way.

Specifically, in the first transmission fault processing method, a network supervisory device 40 that inputs alarm data indicating fault events in the system is provided. When the transmission devices 10A–10D detect a transmission line fault event from the transmission line fault data, notification of secondary fault event alarms generated in the same transmission device 10A–10D due to the transmission line fault is not made to the network supervisory device 40 (corresponds to claim 3).

By means of the third transmission fault processing method of the present invention, notification to the network supervisory device 40 of secondary fault alarm event data is restrained so that the burden on the network supervisory device 40 is not increased and increased traffic on the transmission lines 20A–20D is prevented. In addition, the transmission devices 10A–10D refer to transmission line fault data and withhold from notification of lower level alarm fault data, so it is possible to suppress notification of secondary fault events throughout the entire system when a transmission line fault has occurred.

(Fourth Transmission Fault Processing Method of the Present Invention)

In order to solve the first problem noted above, the fourth transmission fault processing method of the present invention is designed in the following way.

Specifically, in the third transmission fault processing method, the transmission devices 10A–10D have inter-terminal path configuration data for the terminals 30A–30D connected to the transmission devices 10A–10D. When a transmission line fault event is detected from the transmission line fault data, a determination as to whether or not the transmission line fault event affects the connected terminals 30A–30D is made from the path configuration data. If effects are determined, notification of secondary fault event alarm data in the connected terminals 30A–30D is not made to the network supervisory device 40 (corresponds to claim 4).

By means of the fourth transmission fault processing method of the present invetnion, inter-terminal 30A–30D alarm data notification is suppressed only for those affected by the transmission line fault event. In addition, each transmission device 10A–10D references transmission line fault data and withholds from notification of lower level alarm fault data, so it is possible to suppress notification of secondary faults throughout the entire system when a transmission line fault has occurred.

(Fifth Transmission Fault Processing Method of the Present Invention)

In order to solve the first problem noted above, the fifth transmission fault processing method of the present invention is designed in the following way.

Specifically, in the third transmission fault processing method, the transmission devices 10A–10D, when a transmission line fault event has been detected from the transmission line fault data, notify the network supervisory device 40 of the transmission line fault event as a higher level alarm and then suppress secondary fault events, making notification of the remaining faults as lower level alarms (corresponds to claim 5).

By means of the fifth transmission fault processing method, lower level alarm notification is made after higher level alarm notification is made, so the network supervisory device 40 preferentially processes alarms with higher precedence. In addition, each transmission device 10A–10D references transmission line fault data and withholds from notification of lower level alarm fault data, so it is possible to suppress notification of secondary faults throughout the entire system when a transmission line fault has occurred.

(First Transmission Fault Processing Device of the Present Invention)

Figure 2:
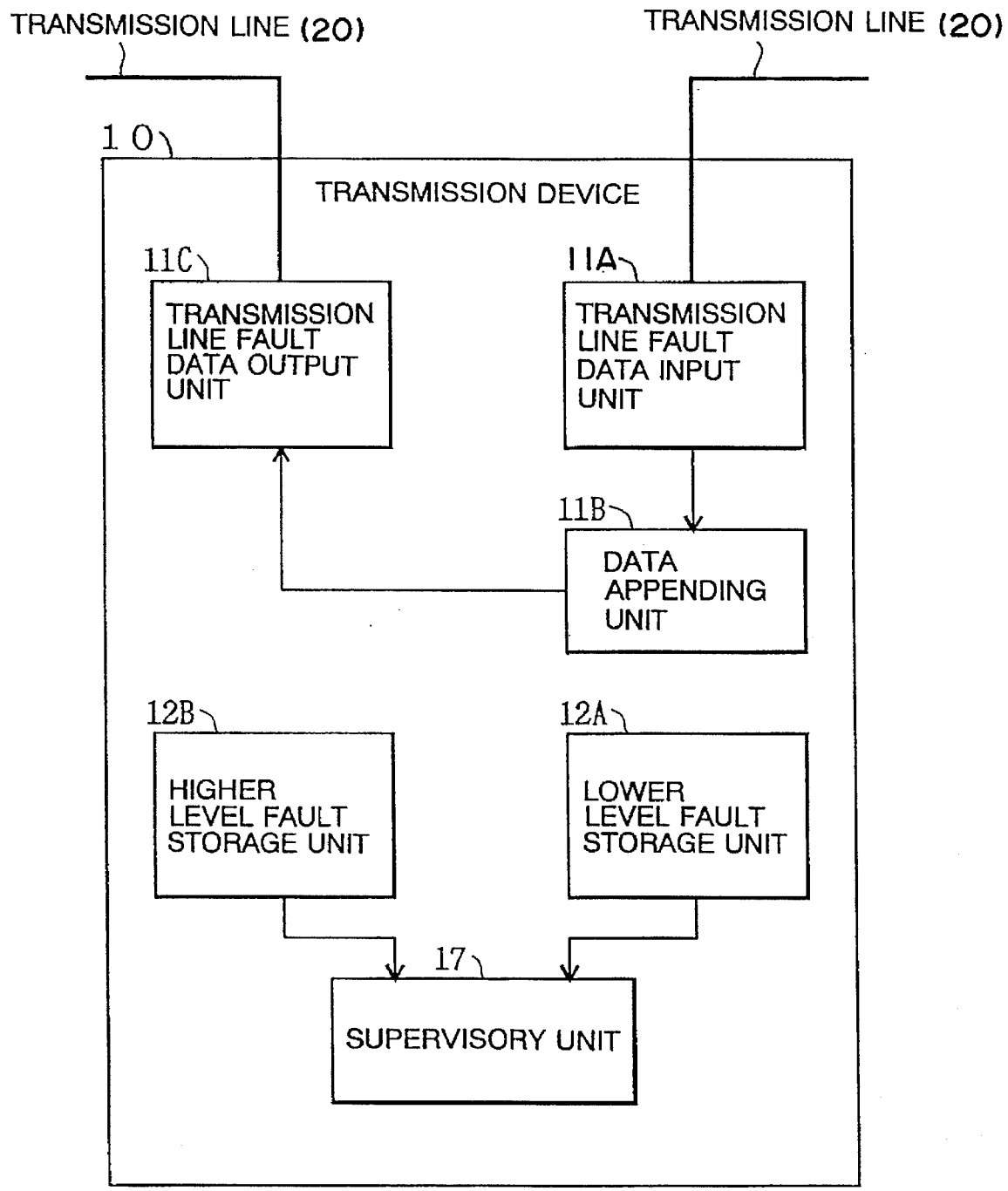
FIG. 2 is a basic structure diagram depicting the transmission fault processing method of the present invention.
Figure 3:
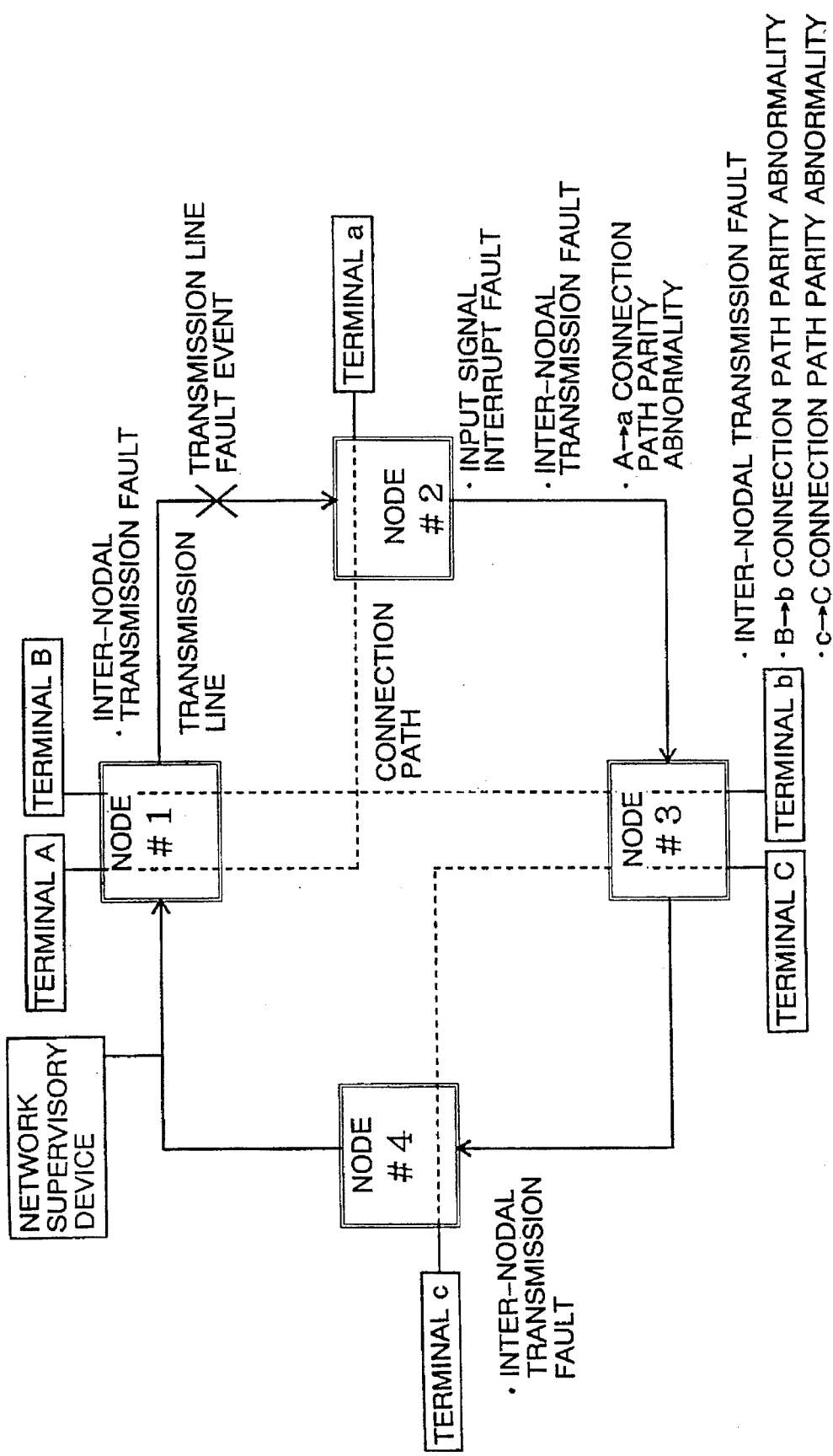
FIG. 3 is a diagram depicting an example of alarm generation when a transmission line fault occurs.

In order to solve the second problem noted above, the first transmission fault processing device of the present invention is designed in the following way. FIG. 2 is a basic structure diagram reflecting the first transmission fault processing device.

Specifically, the device provided to the transmission devices 10A–10D of a system comprising a plurality of transmission devices 10A–10D and transmission lines 20A–20D connecting these transmission devices 10A–10D are furnished with transmission line fault data input units 11A, data appending units 11B, transmission line fault data output units 11C, lower level fault storage units 12A, higher level fault storage units 12B, and supervisory units 17 (corresponds to claim 6).

(Transmission Line Fault Data Input Unit 11A)

The transmission line fault data input unit 11A inputs from the transmission lines 20A–20D transmission line fault data indicating fault event conditions on the transmission lines 20A–20D.

(Data Appending Unit 11B)

The data appending unit 11B, when a fault on a connecting transmission line 20A–20D has been verified, appends the verified transmission line 20A–20D fault data to the transmission line fault data input by the transmission line fault data input unit 11A. Appending here refers, in addition to adding data, the updating of existing data.

(Transmission Line Fault Data Output Unit 11C)

The transmission line fault data output unit 11C outputs the transmission line fault data to the transmission lines 20A–20D.

(Lower Level Fault Storage Unit 12A)

The lower level fault storage unit 12A stores fault data for faults other than those occurring on the transmission lines 20A–20D.

(Higher Level Fault Storage Unit 12B)

The higher level fault storage unit 12B stores fault data for faults occurring on the transmission lines 20A–20D.

(Supervisory Unit 17)

The supervisory unit 17 monitors fault events on the basis of fault data stored in the lower level fault storage unit 12A and fault data stored in the higher level fault storage unit 12B.

By means of the first transmission fault processing device of the present invention, each transmission device 10A–10D references transmission line fault data and withholds from notification of lower level alarm fault data, so it is possible to suppress notification of secondary faults throughout the entire system when a transmission line fault has occurred and to prevent increased traffic on the transmission lines.

(Second Transmission Fault Processing Device of the Present Invention)

In order to solve the second problem noted above, the second transmission fault processing device of the present invention is designed in the following way.

Specifically, in the first transmission fault processing device, when the transmission lines 20A–20D are duplex, the transmission line fault data is provided independently to the two transmission systems (corresponds to claim 7).

By means of the second transmission fault processing device of the present invention, the action of the first transmission fault processing device is performed for each duplex system so that the effect of the first transmission fault processing device is achieved.

(Third Transmission Fault Processing Device of the Present Invention)

In order to solve the second problem noted above, the third transmission fault processing device of the present invention is designed in the following way.

Specifically, in the first transmission fault processing device, a transmission line fault data assembly unit 11D that assembles transmission line fault data when transmission line fault data cannot be input from the transmission lines 20A–20D is provided (corresponds to claim 8).

By means of the third transmission fault processing device of the present invention, even when transmission line fault data cannot be input, the remaining transmission system can be expected to function normally. In addition, the transmission devices 10A–10D refer to transmission fault data and withhold from notification of lower level alarm fault data, so it is possible to suppress notification of secondary faults throughout the entire system during a transmission line fault event and to prevent an increase in traffic on transmission lines.

Embodiment

An embodiment of the transmission fault processing device of the present invention will be described referring to the drawings.

(Transmission System Employing Transmission Fault Processing Device)

Figure 4:
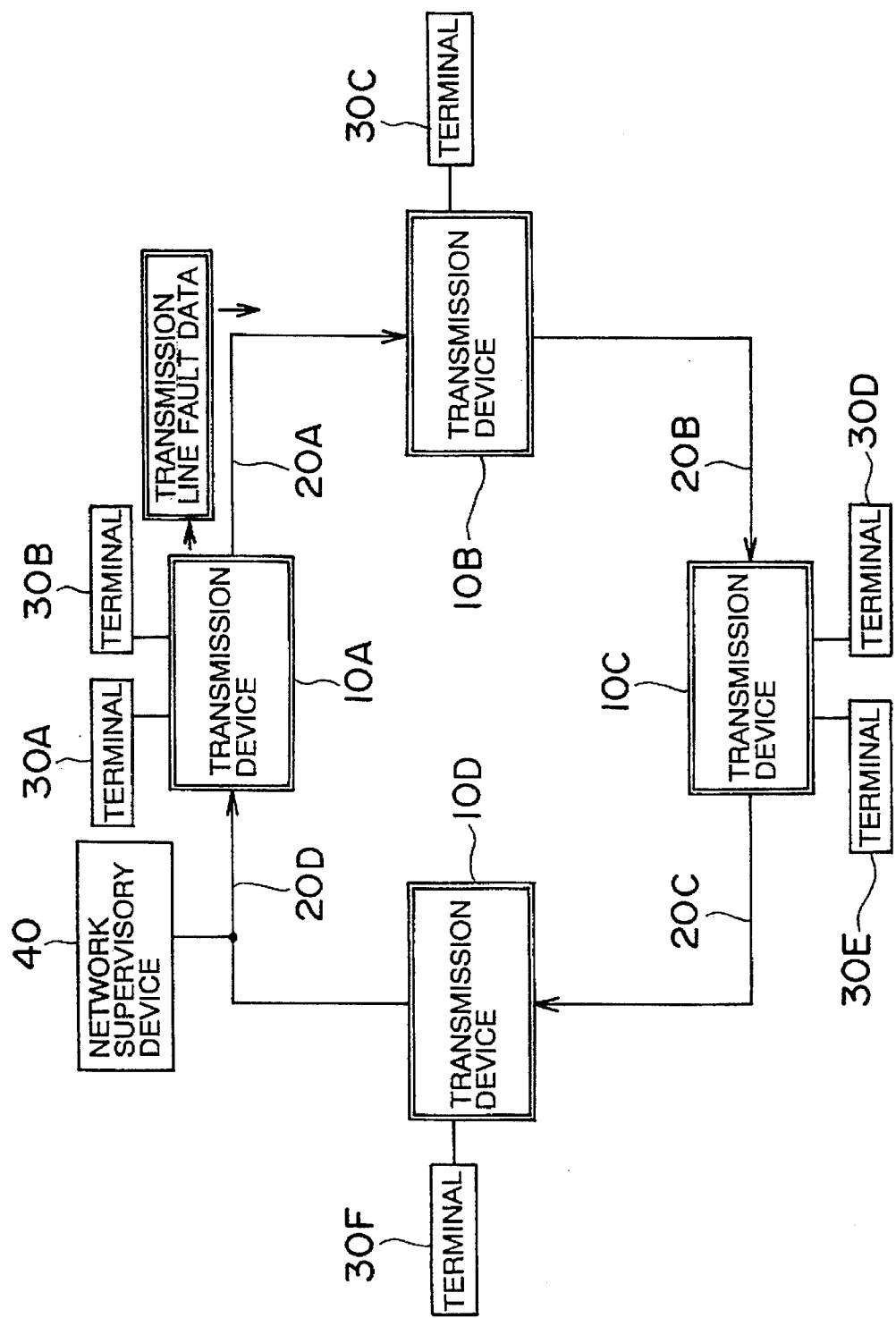
FIG. 4 is a diagram depicting the transmission system of the embodiment.

FIG. 4 shows a transmission system employing the transmission fault processing device. The transmission system comprises terminals 30A–30F, transmission devices (also termed nodes) 10A–10D, transmission lines 20A–20D, and a network supervisory device 40. Each structural element is described below.

(Terminals 30A–30F)

Terminal 30A and terminal 30B are connected to transmission device 10A.

Terminal 30C is connected to transmission device 10B.

Terminal 30D and terminal 30E are connected to transmission device 10C.

Terminal 30F is connected to transmission device 10D.

Each of terminals 30A–30F can utilize a telephone, facsimile, computer, or other device.

(NetWork Supervisory Device 40)

The network supervisory device 40 is connected to transmission line 20D, and supervises fault events in the transmission system.

(Transmission Lines 20A–20D)

Transmission lines 20A–20D can be duplexed in operations system/spare system or 0 system/1 system fashion.

(Connection Relationships Among Transmission Device 10A–10D)

Transmission device 10A and transmission device 10B are connected by transmission line 20A.

Transmission device 10B and transmission device 10C are connected by transmission line 20B.

Transmission device 10C and transmission device 10D are connected by transmission line 20C.

Transmission device 10D and transmission device 10A are connected by transmission line 20D.

(Structure of Transmission Device 10A–10D)

Figure 5:
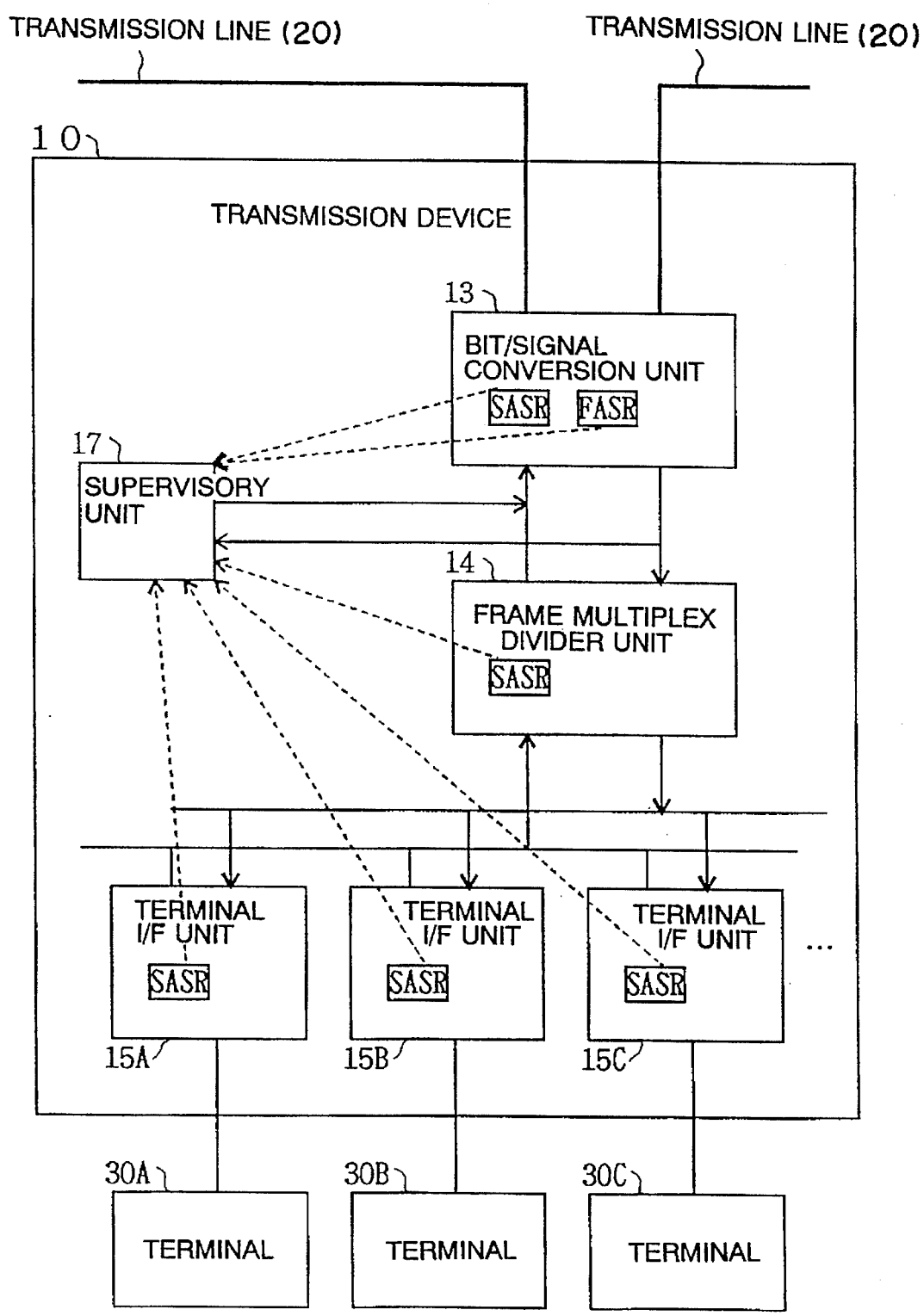
FIG. 5 is a structure diagram of a node (transmission device) of the embodiment.

As depicted in FIG. 5, the structure of transmission devices 10A–10D is provided with a bit/signal converter 13, a frame multiplex division unit 14, terminal I/F units 15A–15C, and supervisory component 17.

(Bit/signal Converter 13)

The bit/signal converter 13 effects conversion between electrical signals and optical signals flowing through the transmission line 20 and bit strings, which are the data format in the node.

The bit/signal converter 13 also has a higher level fault data storage unit FASR that indicates fault event conditions on the transmission line by bit on/off and a lower level fault data storage unit SASR that indicates fault event conditions within the transmission device by bit on/off.

(Frame Multiplex Division Unit 14)

The frame multiplex division unit 14 divides multiplexed data output from the bit/signal converter 13 for distribution to the terminal I/Fs 15 and multiplexes data output from the terminal I/Fs 15 for output to the bit/signal converter 13.

In addition, the frame multiplex division unit 14 has a higher level fault data storage unit FASR that indicates fault event conditions on the transmission line by bit on/off.

(Terminal I/F Units 15A–15C)

The terminal I/F units 15A–15C take charge of interface with the connected terminals 30A–30C.

The terminal I/F units 15A–15C have a higher level fault data storage unit FASR that indicates fault event conditions on the transmission line by bit on/off.

(Supervisory Unit 17)

The supervisory unit 17 reads out fault event conditions from the higher level fault data storage units FASR provided to the bit/signal converter 13, the frame multiplex division unit 14, and the terminal I/F units 15A–15C and reads out fault event conditions from the lower level fault data storage unit SASR provided to the bit/signal converter 13. Then, as depicted in FIG. 6, various types of alarms are generated from logical relationships and notification is made to the network supervisory device 40.

Figure 6:
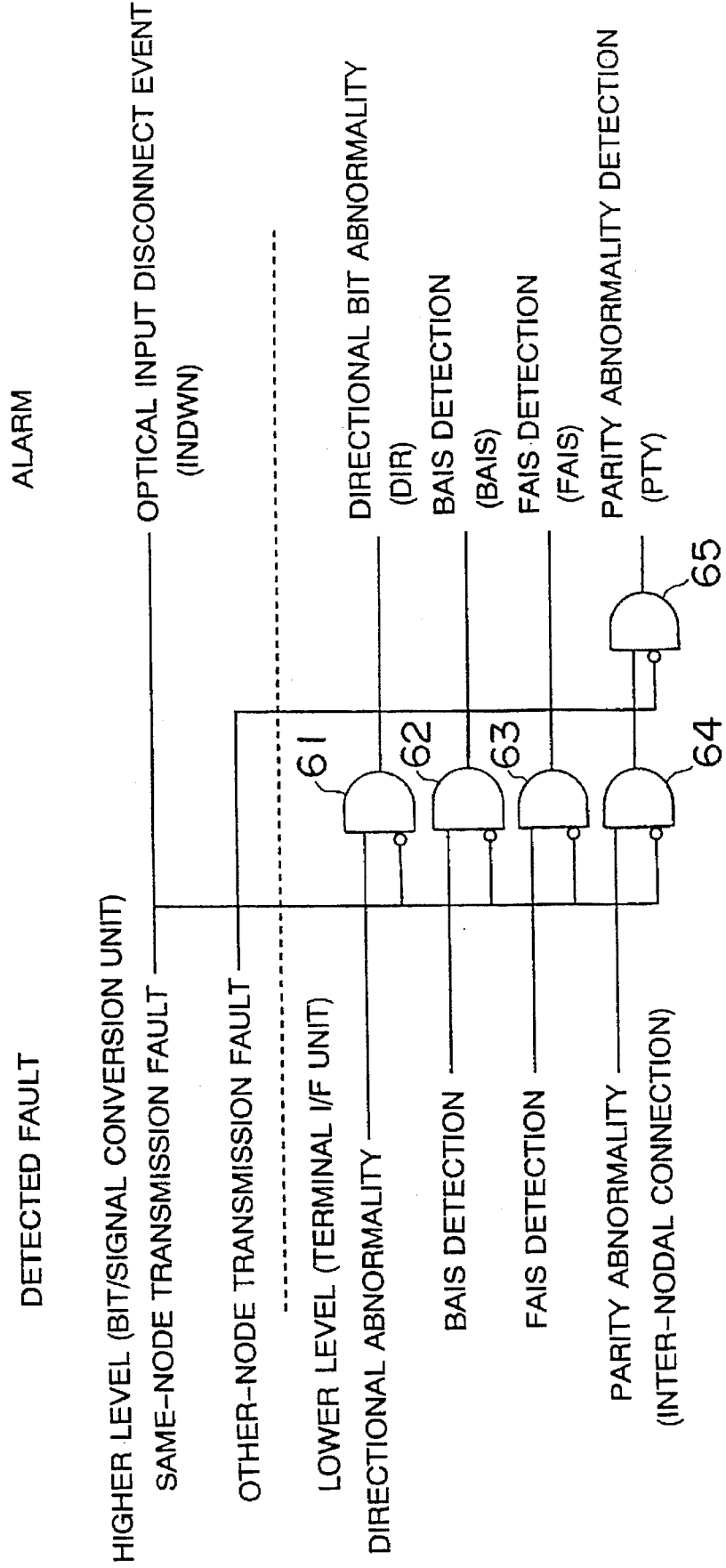
FIG. 6 is a diagram depicting the relationship between higher level alarms and lower level alarms of the embodiment.

The logical relationships in FIG. 6 are described below.

When a same-node transmission line fault is detected, an optical input disconnect event alarm (INDWN) is generated.

When a directional abnormality occurs while no same-node transmission line fault is detected, directional bit abnormality event alarm (DIR) is generated.

When BAIS is detected while no same-node transmission line fault is detected, a BAIS detection alarm (BAIS) is generated.

When a parity abnormality is detected while no same-node transmission line fault is detected, and additionally no other-node transmission line faults are detected, a parity abnormality detection alarm (PTY) is generated.

(Structure of Transmission Device 10A–10D Bit/signal Converter 13)

Figure 7:
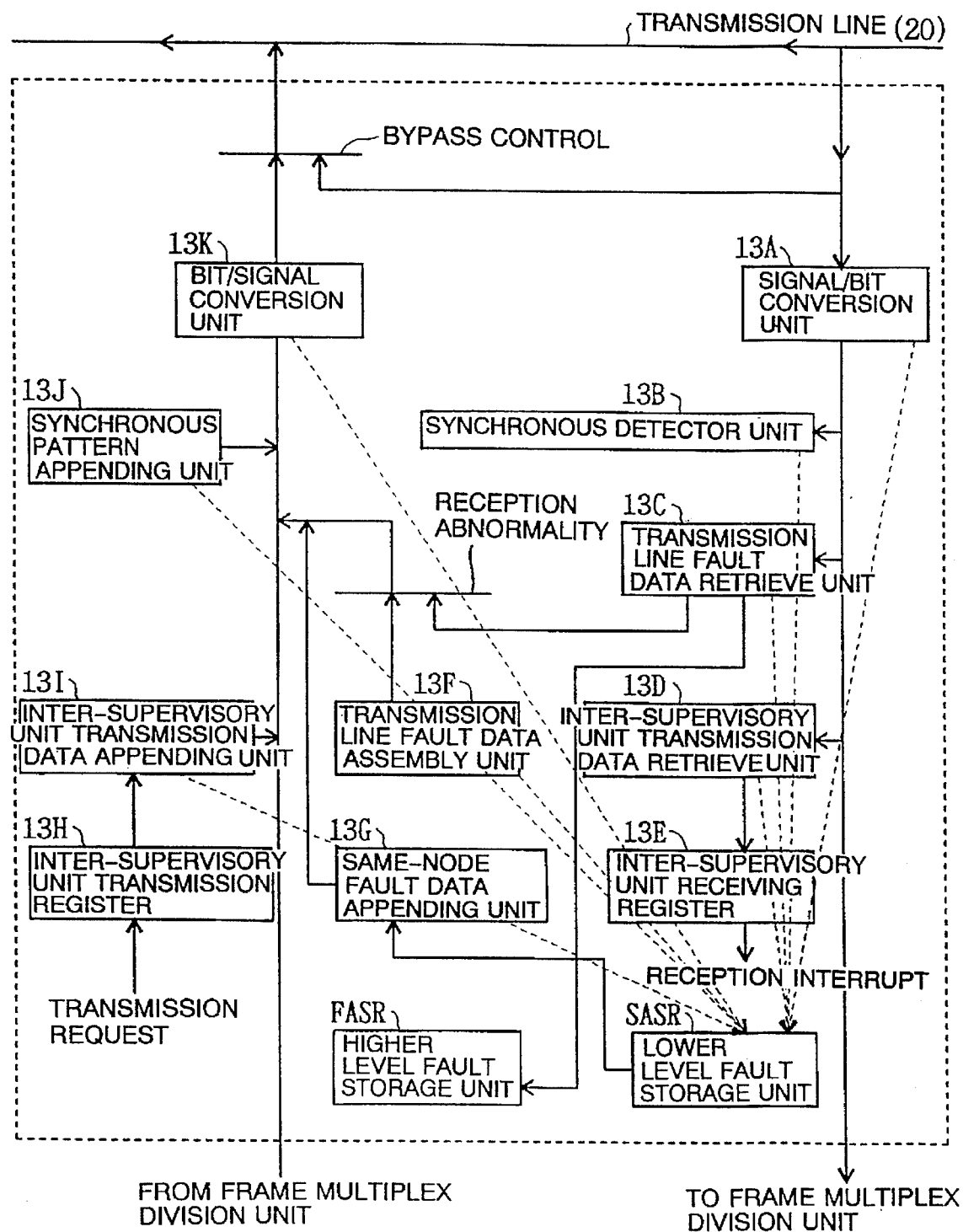
FIG. 7 is a detail structure diagram of the bit/signal converter of the embodiment.

As depicted in FIG. 7, the bit/signal converter 13 of a transmission device 10A–10D comprises a signal/bit conversion unit 13A, a synchronous detector unit 13B, a transmission line fault data retrieve unit 13C, a higher level fault data storage unit FASR, a lower level fault data storage unit SASR, an inter-supervisory unit transmission data retrieve unit 13D, an inter-supervisory unit receiving register 13E, a transmission line fault data assembly unit 13F, a same-node fault data appending unit 13G, an inter-supervisory unit transmission register 13H, an inter-supervisory unit transmission data appending unit 13I, a synchronous pattern appending unit 13J, and a bit/signal conversion unit 13K.

(Signal/bit Conversion Unit 13A)

The signal/bit conversion unit 13A converts and retrieves signals (optical signals or electrical pulse signals) flowing over the transmission line 20 into 0/1 bit patterns (bit string data) and assembles them into frames.

Figure 8:
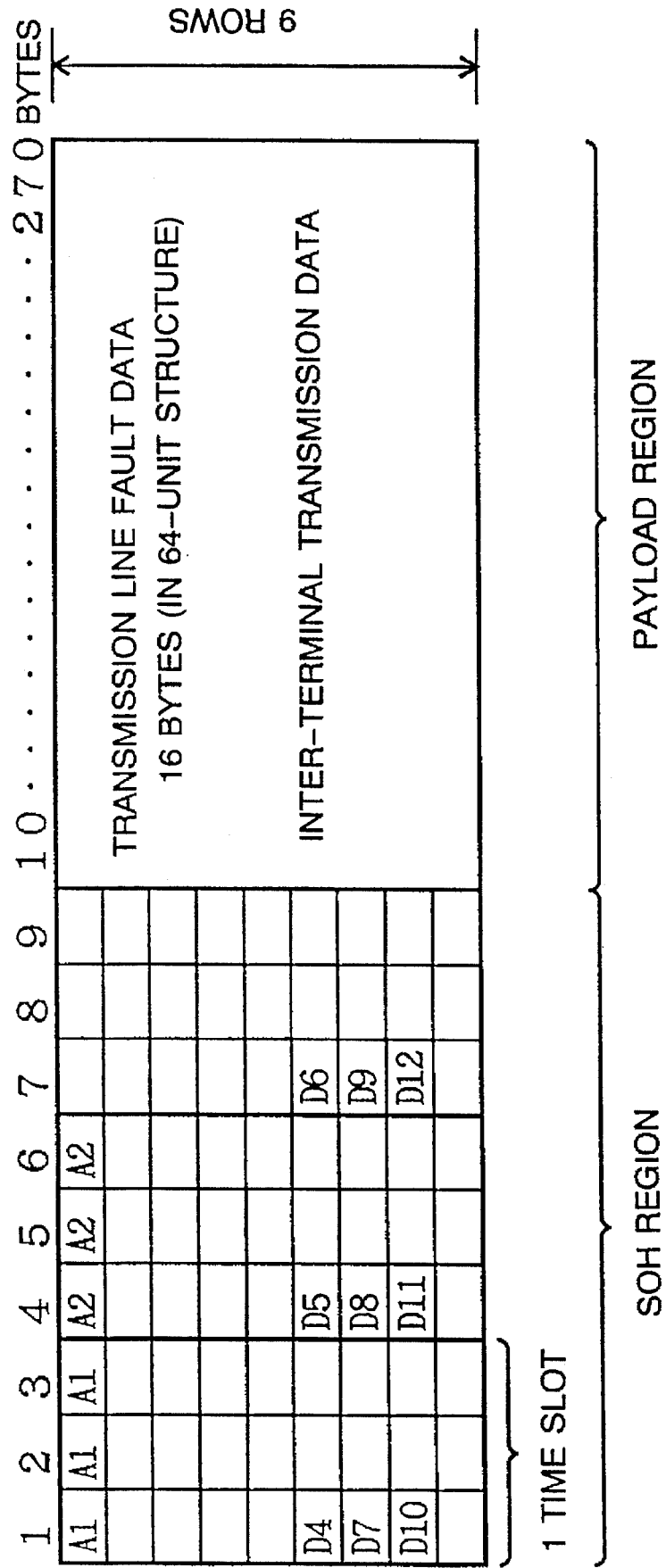
FIG. 8 is a diagram depicting the data frame of the embodiment.

An example of an assembled data frame is depicted in FIG. 8.

The data frame is based on CCITT-recommended SDH format; data is clustered in 9 rows with 270 bytes per row. The first byte to the ninth byte of each row of the data frame constitute a header region (SOH: start of heading) that stores header data; the tenth byte to the two-hundred and seventieth byte are the payload region that stores data. This payload region contains transmission line fault data and inter-terminal transmission data.

The data frame is assembled in order from the first byte to the two-hundred and seventieth byte of the first row, assembled in order from the first byte to the two-hundred and seventieth byte of the second row, and so on in like fashion through the ninth row.

(Synchronous Detector Unit 13B)

The synchronous detector unit 13B detects synchronous pattern bits (in FIG. 8, the three byte area A1 of bytes 1 to 3 and the three byte area A2 of bytes 4 to 6 in row 1) from the frames assembled by the signal/bit conversion unit 13A and synchronizes the frames.

Frame-synchronized data is output to the frame multiplex division unit 14.

(Transmission Line Fault Data Retrieve Unit 13C)

The transmission line fault data retrieve unit 13C retrieves transmission line fault data from fixed bands (time slots) in data passing through the transmission lines. The fixed bands are predetermined by the system.

The transmission line fault data is described referring to FIG. 9.

In FIG. 9, the numbers 7 through 0 written in the top row indicate bit locations; the "0" or "1" following "in" indicated the transmission line 20 system number. The two-digit number following "in#." (where #=0 or 1) indicates the two node numbers. For example, "in0.64" indicates the transmission line between nodes number 6 and 4 on transmission line 20 of the 0 system. If the value of the region in which "in0.64" is written is "0", this indicates that there is no transmission line fault between nodes number 6 and 4 on transmission line 20 of the 0 system. If region has a value of "1", this indicates that there is a transmission line fault between nodes number 6 and 4 on transmission line 20 of the 0 system. The node numbers in this description do not correspond to the transmission device numbers in FIG. 4; for example, substitutions have been made so that transmission device 10A is number 1 and transmission device 10B is number 2.

(Higher Level Fault Data Storage Unit FASR)

The higher level fault data storage unit FASR stores (reflects) data retrieved by the transmission line fault data retrieve unit 13C, i.e. same-node transmission line faults data and other-node transmission line faults data.

(Lower Level Fault Data Storage Unit SASR)

The lower level fault data storage unit SASR stores (reflects) alarm data detected by the signal/bit conversion unit 13A, the synchronous detector unit 13B, the transmission line fault data retrieve unit 13C, the inter-supervisory unit transmission data retrieve unit 13D, the transmission line fault data assembly unit 13F, the inter-supervisory unit transmission data appending unit 13I, the synchronous pattern appending unit 13J, and the bit/signal conversion unit 13K, i.e., intra-device alarm data.

The alarm data, for example, relates to signal input interrupt faults detected by the signal/bit conversion unit 13A or relates to frame misalignment detected by the synchronous detector unit 13B.

(Inter-supervisory Unit Transmission Data Retrieve Unit 13D)

The inter-supervisory unit transmission data retrieve unit 13D retrieves inter-nodal transmission data (in FIG. 8, first to ninth byte areas D4–D12 in rows 6–9) from received frames.

(Inter-supervisory Unit Receiving Register 13E)

The inter-supervisory unit receiving register 13E stores (reflects) data retrieved by the inter-supervisory unit transmission data retrieve unit 13D. The stored values are used in reception interrupts.

(Transmission Line Fault Data Assembly Unit 13F)

When a reception abnormality prevents transmission line fault data from being retrieved by the transmission line fault data retrieve unit 13C, the transmission line fault data assembly unit 13F creates dummy data (transmission line fault non-event data).

Either the transmission line fault data assembly unit 13F output and the transmission line fault data retrieve unit 13C output is input to the bit/signal conversion unit 13K.

(Same-node Fault Data Appending Unit 13G)

On the basis of values stored in the lower level fault data storage unit SASR, the same-node fault data appending unit 13G appends indication of detection or non-detection of same-node transmission line faults to transmission line fault data retrieved by the transmission line fault data retrieve unit 13C or to transmission line fault data assembled by the transmission line fault data assembly unit 13F.

(Inter-supervisory Unit Transmission Register 13H)

The inter-supervisory unit transmission register 13H stores (reflects) content of transmitted requests from the supervisory unit 17.

(Inter-supervisory Unit Transmission Data Appending Unit 13I)

The inter-supervisory unit transmission data appending unit 13I appends the contents of the inter-supervisory unit transmission register 13H to inter-nodal transmission data (in FIG. 8, first to ninth byte areas D4–D12 in rows 6–9).

(Synchronous Pattern Appending Unit 13J)

The synchronous pattern appending unit 13J appends synchronous pattern bits (in FIG. 8, first to sixth byte areas A1–A2 in row 1) to data output from the frame multiplex divider unit 14.

(Bit/signal Conversion Unit 13K)

The bit/signal conversion unit 13K converts synchronous pattern bit-appended data from the synchronous pattern appending unit 13J to the signals (optical signal or electrical pulse signals) passing over the transmission line 20.

Bit/signal conversion unit 13K output and transmission line 20 input signals are bypass-controlled for output to the transmission line.

(Operation in the Embodiment)

Next, operation in the embodiment will be described. In the following description, transmission devices 10A, 10B, 10C, and 10D are referred to as nodes 1, 2, 3, and 4, respectively.

First, in the transmission system in the embodiment depicted in FIG. 4, it is assumed that a transmission line fault has occurred in the 0 system of the transmission line between node 1 and node 2. At this time, as a higher level alarm, an optical input disconnect event alarm INDWN is detected at node 2 and, as lower level alarms, inter-nodal transmission fault (which are generated unconditionally at each node) and path parity (which are generated only on the concerned path) alarms are detected.

At node 2 at which the optical input disconnect event alarm INDWN has been generated, transmission line fault data cannot be retrieved, so dummy data is created by the transmission line fault data assembly unit 13F in node 2 and a "1" is placed in the bit (in0.02) indicating a fault event on system 0 of node 2. Other nodes take this data, which is stored (reflected) in the higher level fault data storage units FASR.

Figure 15:
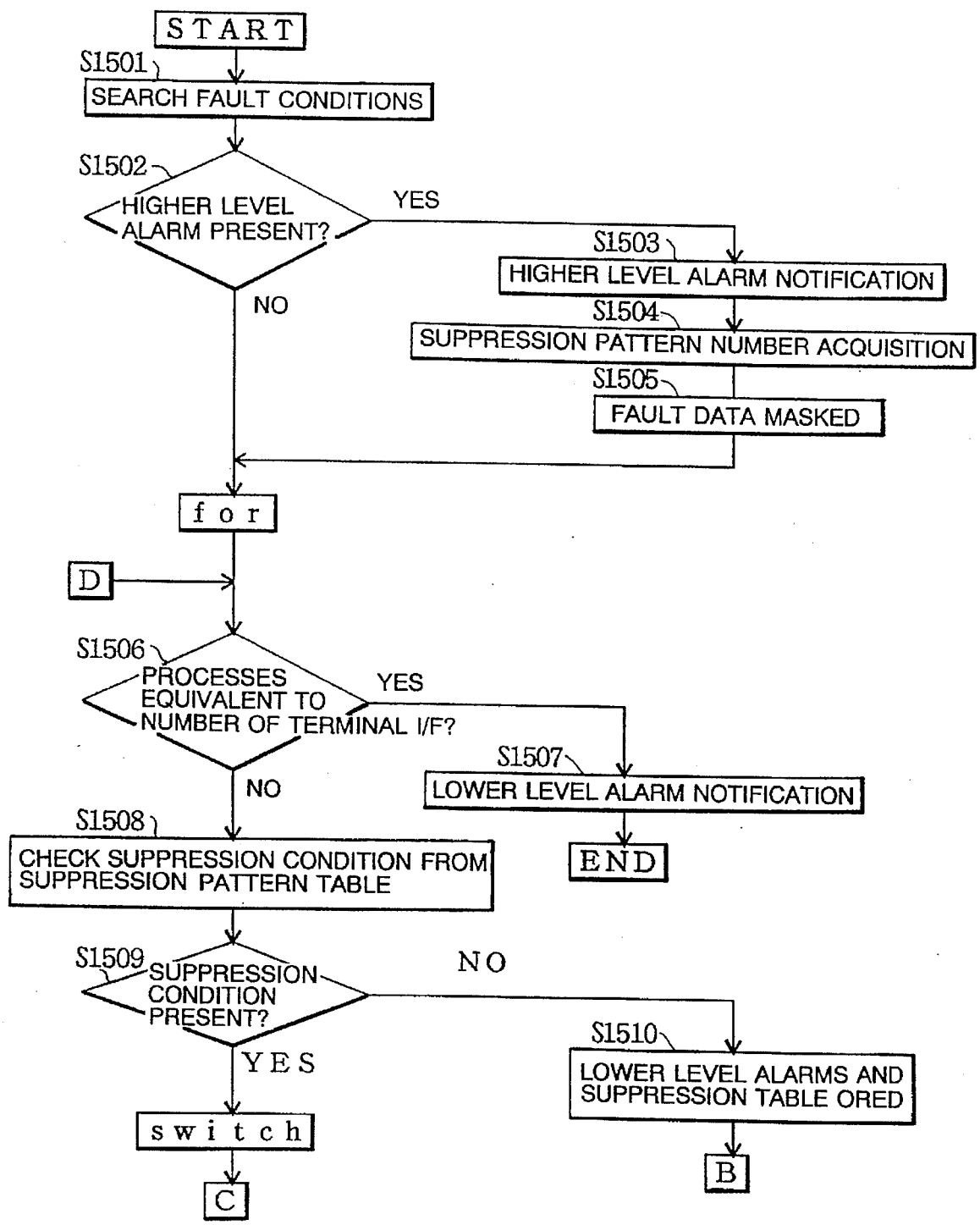
FIG. 15 is an alarm suppression process flow chart (1) of the embodiment.

Meanwhile, the supervisory unit 17 of each node, referring to the relationships depicted in FIG. 6 and the various tables depicted in FIGS. 10 through 14, suppresses the lower level alarms by the procedure depicted in FIG. 15. Here, the various tables depicted in FIGS. 10 through 14 are created one-dimensionally by the network supervisory device 14 during system design and are given to each node.

Figure 16:
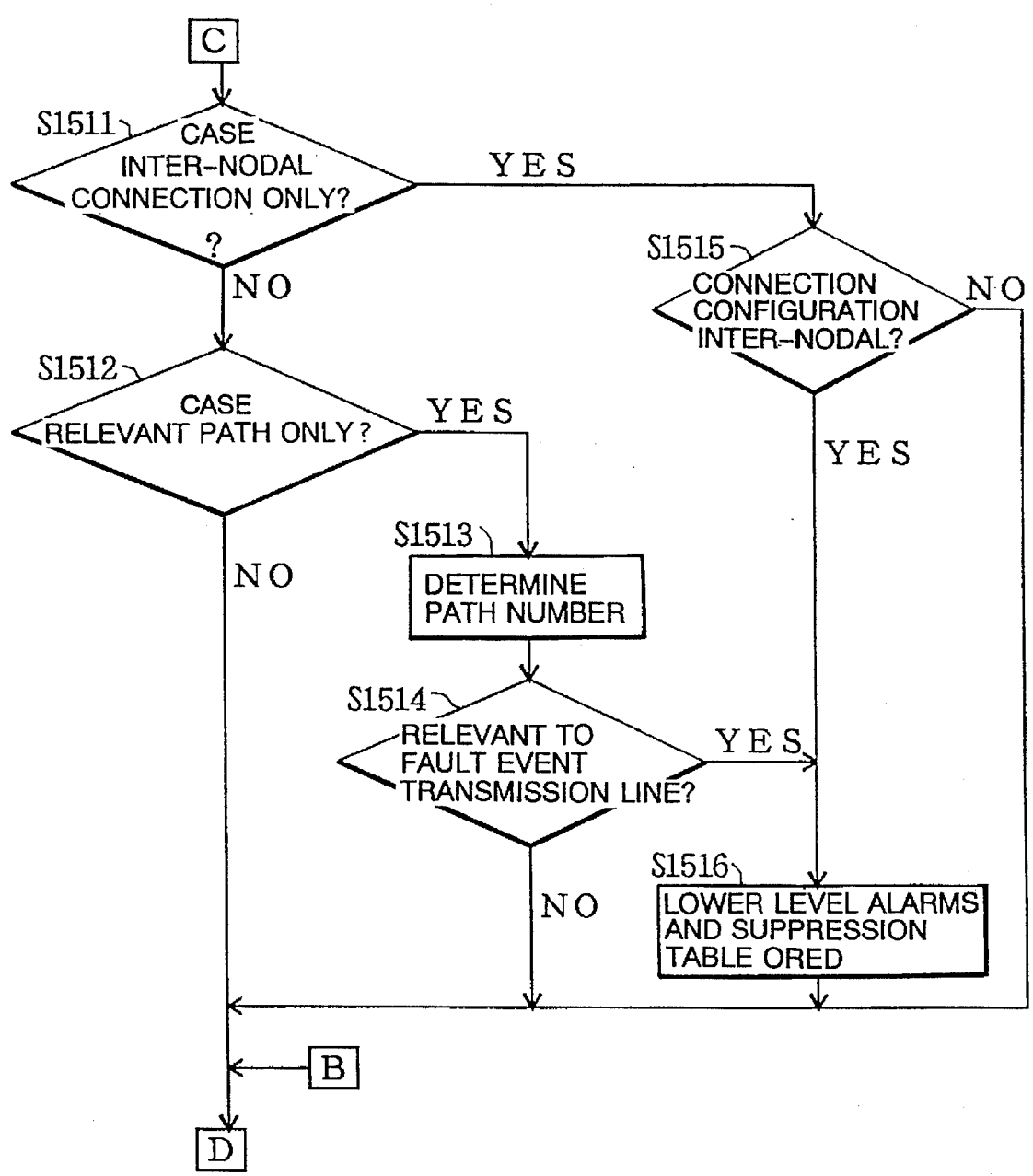
FIG. 16 is an alarm suppression process flow chart (2) of the embodiment.

Next, the alarm suppression process will be described referring to FIG. 15 and FIG. 16.

The supervisory units 17 on each node 1 through 4 periodically monitor the higher level fault data storage units FASR provided to the bit/signal conversion units 13 and periodically monitor the lower level fault data storage units SASR provided to the bit/signal conversion units 13, the frame multiplex division units 14, and the terminal I/F units 15A–15C, first checking the fault condition of the bit/signal conversion units 13 (step 1501).

Next, utilizing the relationships depicted in FIG. 6, a determination as to whether a higher level alarm is present made (step 1502).

If a determination that an alarm is present is made in step 1502, the other nodes are notified of the higher level alarm (step 1503).

Next, utilizing the table depicted in FIG. 10, a suppression pattern number is obtained (step 1504). For example, under the conditions depicted in FIG. 4, the suppression pattern number for node 2 is 1 while the suppression pattern number for the other nodes is 2.

In the table depicted in FIG. 10, when there are unconditionally suppressed lower level alarms, the corresponding fault data is masked (step 1505). For example, under the conditions depicted in FIG. 4, inter-nodal transmission fault alarms are masked for all nodes.

Next, it is determined whether the processes of step 1508 on have been performed in equivalence to the number of connected terminal I/Fs (step 1506) and if it is determined that these processes have been performed, notification of lower level alarms is made (step 1507) and the alarm suppression process is terminated.

In step 1506, when processes equivalent to the number of connected terminal I/Fs have not been completed, the suppression conditions are checked from the suppression pattern table depicted in FIG. 10 (step 1508).

It is then determined whether or not the are suppression conditions (step 1509).

If step 1509 gives a "NO", i.e., when it is determined that there are no suppression conditions, lower level alarms are ORed with the suppression table (step 1510).

If a "YES" determination is made in step 1509, and if the higher level alarm gives a suppression condition for inter-nodal connection only due to a transmission line fault at another node (the suppression pattern number equals 2) (step 1511), a determination as to whether the connection configuration is inter-nodal is made (step 1515).

If a "YES" determination is made in step 1515, the corresponding suppression data is retrieved from the alarm suppression table depicted in FIG. 12 and is ORed with the alarm data outputted from terminal I/F unit 15A–15C (step 1516). Here, the alarm suppression table performs masked/ unmasked data data classification, setting pattern-masked bits to 0 and unmasked bits to 1. As a result, the alarm data is masked in the manner depicted in FIG. 11. The meanings of the symbols used in FIG. 11 are as follows.

BAIS0: BAIS alarm detected on 0 system side
BAIS1: BAIS alarm detected on 1 system side
CK0DN: clock input interrupt occurred on 0 system side
CK1DN: clock input interrupt occurred on 1 system side
di0.: directional bit abnormality detected on channel  0 system side
di1.: directional bit abnormality detected on channel  1 system side
DIR0IL: directional bit abnormality detected on 0 system side
DIR1IL: directional bit abnormality detected on 1 system side
FP0DN: frame pulse interrupt occurred on 0 system side
FP1DN: frame pulse interrupt occurred on 1 system side
PRY0DE: parity abnormality alarm detected on 0 system side
PRY1DE: parity abnormality alarm detected on 1 system side
PT0.: parity abnormality alarm detected on channel  0 system side
PT1.: parity abnormality alarm detected on channel  1 system side
SEL0AL: reception selection circuit abnormality occurred on 0 system side
SEL1AL: reception selection circuit abnormality occurred on 1 system side Next, if a "YES" determination is made in step 1509, and if the higher level alarm gives a suppression condition specifying suppression of the relevant path only due to a transmission line fault at another node (the suppression pattern number equals 2) (step 1512), the path number is determined from the table depicted in FIG. 13 (step 1513).

Next, from the table depicted in FIG. 14, it is determined whether the path determined in step 1513 has relation to the transmission line on which the fault has occurred (step 1514). For example, under the conditions depicted in FIG. 4, it is determined that the terminal 30D and the terminal 30E connected to node 3 are affected.

If a "YES" determination, i.e., a determination of relevance, is made in step 1514, step 1516 is executed. Under the conditions depicted in FIG. 4, node 3 retrieves the pattern 2 0 system fault data, which is ORed with the alarm data outputted from the terminal I/F unit 15A–15C.

The processes from step 1506 on are repeated, when a "NO" determination is made in step 1515, after the process of step 1516, or, when a "NO" determination is made in step 1514, when a "NO" determination is made in step 1512 and after the process of step 1510.

(Merits of the Embodiment)

As described above, by means of this embodiment, at the point in time at which high-priority higher level alarms are detected the supervisory unit 17 is notified thereof, and low-priority lower level alarms are searched and suppressed. Notification of higher level alarms is then made to the network supervisory device 40 with priority over the lower level alarms. Thus, even when a plurality of higher level alarms and lower level alarms occur simultaneously within the transmission system, the higher level alarms are not affected by the lower level alarm suppression process of the present invention, so that the higher level alarms are afforded priority in processing.

Node 2 in FIG. 4 cannot acquire transmission line fault data due to a transmission line fault, but the supervisory unit 17 can be apprised of the transmission line fault by the lower level fault data storage unit SASR. Thus, the suppression pattern number determined from FIG. 10 is 1 and internodally connected terminal 30 alarm suppression processes can be performed regardless of path configuration.

What is claimed is:

1. A transmission fault processing device provided to transmission devices of a system having a plurality of transmission devices and transmission lines connecting said transmission devices in a series to form a closed loop via the transmission lines, the transmission fault processing device comprising:

a transmission line fault data input unit that retrieves transmission lines fault data indicating fault event conditions on the transmission lines from each data frame circulated in the transmission devices through the transmission lines;

a data appending unit that, when a fault on a connecting transmission line through which data frames are transmitted to a transmission device has been verified, appends data that indicate that a fault has occurred on the connecting transmission line to the transmission line fault data retrieved by the transmission line fault data input unit;

a transmission line fault data output unit that adds the transmission line fault data to a data frame to be output from the transmission device;

a lower level fault storage unit that stores alarm data corresponding to alarms generated in the transmission device;

a higher level fault storage unit that stores transmission line fault data retrieved by the transmission line fault data input unit; and a supervisory unit that monitors fault events in the transmission device on the basis of alarm data stored in the lower level fault storage unit and the transmission line fault data stored in the higher level fault storage unit.

2. A transmission fault processing device as defined in claim 1, further comprising:

a transmission line fault data assembly unit that assembles transmission line fault data indicating that a fault has occurred on the connecting line when transmission line fault data cannot be retrieved by the transmission line fault data input unit.

3. A ring transmission system including a plurality of transmission devices and transmission lines connecting the transmission devices in a series to form a closed loop, each of the transmission devices comprising:

circulating means for circulating data frames among the transmission devices via the transmission lines, each of the data frames including transmission line fault data which indicate fault event conditions of the transmission lines;

detecting means for detecting an occurrence of a fault on a connecting transmission line through which said circulating means receive the data frames;

adding means for adding, when the occurrence of the fault is detected by said detecting means, data indicating that a fault has occurred on the connecting transmission line, to the transmission line fault data in the data frame to be transmitted by said circulating means; and suppressing means for suppressing alarms generated secondarily in the transmission device due to the fault on the transmission lines, using the transmission line fault data in the data frame received by said circulating means.

4. The ring transmission system as defined in claim 3, wherein each of the transmission devices further comprises generating means for generating transmission line fault data indicating that a fault has occurred in the connecting transmission line when transmission line fault data cannot be retrieved from the data frame received by said circulating means, and adding the transmission line fault data to the data frame to be transmitted by said circulating means.

5. The ring transmission system as defined in claim 3, and further comprising a network supervisory device connected to one of the transmission lines for supervising conditions of the transmission devices and the transmission lines on the basis of alarm data in the data frames circulated in the transmission lines, and wherein each of the transmission devices further comprises alarm data adding means for adding alarm data corresponding to alarms that are not suppressed by said suppressing means, to the data frame to be transmitted by said circulating means.

6. The ring transmission system as defined in claim 3, wherein each of the transmission devices further comprises storing means for storing interterminal path configuration data specifying the transmission lines used by each of terminals connected to the transmission device, and said suppressing means in each of the transmission devices suppresses alarms generated secondarily due to the fault on the transmission lines using the transmission line fault data in the data frame received by said circulating means and the interterminal path configuration data in said storing means.

7. The ring transmission system as defined in claim 3, further comprising a network supervisory device connected to one of the transmission lines for supervising conditions of the transmission devices and the transmission lines on the basis of alarm data in the data frame circulated among the transmission devices via the transmission lines, and wherein each of the transmission devices further comprises first alarm data adding means for adding, when a fault is detected by said detecting means, alarm data indicating that a fault has occurred in the connecting transmission line, to the data frame to be transmitted by said circulating means, and second alarm data adding means for adding alarm data corresponding to alarms which are not suppressed by said suppressing means, to the data frame to be transmitted by said circulating means.

8. A ring transmission system comprising a plurality of transmission devices and transmission lines connecting the transmission devices in a series to form a first closed loop and a second closed loop, each of the transmission devices including two transmission processing devices for forming the first closed loop and the second closed loop, each transmission processing device comprising:

a transmission line fault data input unit that retrieves transmission lines fault data indicating fault event conditions on the transmission lines from each data frame circulated in the transmission devices through the transmission lines;

a data appending unit that, when a fault on a connecting transmission line through which data frames are transmitted to a transmission device has been verified, appends data that indicate that a fault has occurred on the connecting transmission line to the transmission line fault data by the transmission line fault data input unit;

a transmission line fault data output unit that adds the transmission line fault data to a data frame to be output from the transmission device;

a lower level fault storage unit that stores alarm data corresponding to alarms generated in the transmission device;

a higher level fault storage unit that stores transmission line fault data retrieved by the transmission line fault data input unit; and a supervisory unit that monitors fault events in the transmission device on the basis of alarm data stored in the lower level fault storage unit and the transmission line fault data stored in the higher level fault storage unit.

* * * * *